US008724608B2

(12) United States Patent
Bird et al.

(10) Patent No.: US 8,724,608 B2
(45) Date of Patent: May 13, 2014

(54) RADIO SYSTEM WITH CONFIGURABLE LINKS

(75) Inventors: Neil C. Bird, Eindhoven (GB); Alan J. Davie, East Grinstead (GB)

(73) Assignee: Koninklijke Philips N.V., Eindhoven (NL)

( * ) Notice: Subject to any disclaimer, the term of this patent is extended or adjusted under 35 U.S.C. 154(b) by 1313 days.

(21) Appl. No.: 10/574,433

(22) PCT Filed: Sep. 29, 2004

(86) PCT No.: PCT/IB2004/051920
§ 371 (c)(1),
(2), (4) Date: Apr. 3, 2006

(87) PCT Pub. No.: WO2005/034432
PCT Pub. Date: Apr. 14, 2005

(65) Prior Publication Data
US 2007/0026846 A1    Feb. 1, 2007

(30) Foreign Application Priority Data
Oct. 3, 2003 (GB) .................................. 0323132.1

(51) Int. Cl.
*H04J 1/00* (2006.01)
(52) U.S. Cl.
USPC ........................................................ 370/343
(58) Field of Classification Search
USPC .................... 455/507, 500, 39, 418–420, 455/414.1–414.2, 456.1–456.6, 517–519; 370/343, 310; 340/7.52, 10.33
See application file for complete search history.

(56) References Cited

U.S. PATENT DOCUMENTS

| | | | | |
|---|---|---|---|---|
| 5,493,696 A * | 2/1996 | Wolf | ............................. | 455/518 |
| 5,926,764 A * | 7/1999 | Sarpola et al. | ................ | 455/450 |
| 6,130,602 A * | 10/2000 | O'Toole et al. | ............ | 340/10.33 |
| 6,347,095 B1 * | 2/2002 | Tang et al. | .................... | 370/469 |
| 6,980,083 B2 * | 12/2005 | Sako et al. | .................... | 340/7.52 |
| 2002/0174269 A1 | 11/2002 | Spurgat et al. | | |
| 2003/0162556 A1 * | 8/2003 | Libes | ............................ | 455/507 |
| 2004/0203381 A1 * | 10/2004 | Cahn et al. | .................... | 455/41.2 |
| 2004/0204072 A1 * | 10/2004 | Han et al. | ...................... | 455/557 |
| 2004/0248569 A1 * | 12/2004 | Kondou et al. | ............ | 455/426.1 |
| 2005/0020211 A1 * | 1/2005 | Takikita | ....................... | 455/41.2 |

FOREIGN PATENT DOCUMENTS

| | | |
|---|---|---|
| CN | 2351827 Y | 12/1999 |
| EP | 1 330 075 | 7/2003 |
| JP | H07143043 A | 6/1995 |
| JP | H0816855 A | 1/1996 |
| JP | H11150547 A | 6/1999 |
| WO | 9620464 A | 7/1996 |
| WO | 9917566 A | 4/1999 |
| WO | WO 01/37597 | 5/2001 |

* cited by examiner

Primary Examiner — Brandon Miller

(57) ABSTRACT

A system includes radio devices where radio links between the devices are configured by bringing the radio devices in close proximity with hosts for a few seconds. A proximity detector in the device detects the proximity and an automatic registration process begins to configure a link between the device and nearby host. One-to-one or one-to-many links may be established. Links may be cancelled by repeating the process. The devices may include an indicator to indicate establishment of the link.

24 Claims, 7 Drawing Sheets

RADIO SYSTEM WITH CONFIGURABLE LINKS

The present invention relates to a radio system with user-friendly re-configurable links, a method for reconfiguring the links and devices for providing said links between host apparatus. The present invention has particular, but not exclusive, application to home and portable consumer systems having host apparatus for handling audio/video content, such as portable music/video players, home "Hi-Fi" units, mobile telephones, personal digital assistants/portable computers and the like.

The installation and configuration of a wireless link between two or more host apparatus is often unduly complicated and may require technical knowledge and understanding of, for example, network topology. It is also often difficult for a consumer to know and keep track of which host apparatus is linked to which in his home, and which host apparatus may be linked with which host-apparatus.

It is therefore desirable to provide user friendly reconfigurable wireless links in a radio system.

According to a first aspect of the present invention there is provided a method of configuring a radio link between a first device and a second device, each of which comprises radio means, proximity detection means and timing means, wherein the method comprises said proximity detection means detecting when said first and second device are proximate, timing means detects the duration of proximity and respective radio means configures a link in dependence on said proximity detection and the duration thereof.

According to a second aspect of the present invention there is provided a system having a first radio device and a second radio device, operable to communicate via a configurable radio link therebetween, each device comprising proximity detection means for detecting when said devices are proximate, timing means for detecting the duration of said proximity and radio means for configuring a radio link in dependence on said proximity detection and the duration thereof.

According to a third aspect of the present invention there is provided a radio device operable to communicate via a configurable radio link with a second device, the radio device comprising proximity detection means for detecting when said devices are proximate, timing means for detecting the duration of said proximity and radio means for configuring a radio link in dependence on said proximity detection and the duration thereof.

The above aspects provide a radio system in which a user is enabled to easily configure a wireless link between devices.

In a preferred embodiment the link is provided by first and second radio devices, which are portable and can be plugged into, or engaged with respective host apparatus. The radio devices (or "e-button") must be registered with each other in order to enable their respective hosts to communicate via the radio devices over a link therebetween.

Advantageously, the link is established by a user bringing together the first and second devices so that they are physically separated by a centimetre or less. A proximity detection switch within each device is magnetically operated when the devices are proximate, and a radio micro-controller begins timing the duration of proximity. When the duration exceeds a predetermined duration (for example about 2 seconds), the micro-controller of each device begins the registration process via inbuilt radio transceivers in order to establish a link. Radio identifiers (either provided within said micro-controllers, or randomly generated by said micro-controllers) are exchanged, and an indication (a flashing LED for example) indicates to the user that the link between the devices is established.

The user may then engage each device with a suitably equipped host apparatus, thereby enabling said host apparatus to communicate via the configured link.

When the user wishes to cancel or disable a link, the devices are disengaged from their respective host apparatus and once again brought into close proximity with each other. The micro-controllers, operating in tandem with the proximity detection means as earlier, exchange identifiers and, in recognising the exchanged identifiers as having been previously exchanged, simply delete said identifiers to disable the registration.

Furthermore, in a similar fashion, a single radio device may be registered or associated with many other similar radio devices, enabling "one-to-many" links.

The system provides a simple visual indicator of which apparatus is communicable or linked with another to the user (since the presence of the device engaged with the host apparatus signifies visually to the user the communication capability).

Owing to the inventive aspects described above, the configuration of the aforementioned radio links involves the simple action of bringing together the required devices for a few seconds. Of course, the devices operate the same radio protocol and hence enable wireless links to be added to suitably equipped host apparatus from different manufacturers, ensuring interoperability and a simple radio upgrade path as radio standards improve.

The devices may be sold in blister packs, which the consumer may buy at a later date to the purchase of suitable host apparatus, or the devices may be provided with the sale of said host apparatus to offer additional functionality of said apparatus.

Areas of application comprise the streaming of an audio stream from, for example, a Hi-Fi system having a first radio device to a remote loudspeaker equipped with a second radio device which was earlier registered with the first device as previously described. The consumer may remove the first device from the Hi-Fi system and plug it into a suitably equipped portable audio player such as an MP3 or Minidisc™ player. Hence, content from the portable player may also be streamed to a loudspeaker in the home via the wireless link between first and second engaged devices. The first device may advantageously register with other similar devices engaged in other loudspeakers around the home, hence enabling audibility of the audio content throughout the home.

Such first and second radio devices are hereinafter referred to as "e-buttons", whereas the phrase "host apparatus" comprises consumer electronic and computing devices equipped with e-button receiving or engaging means which engage an e-button and provide data to it for output over a radio link.

Embodiments according to the present invention will now be described, by way of example only, and with reference to the accompanying drawings in which.

Figure 1:
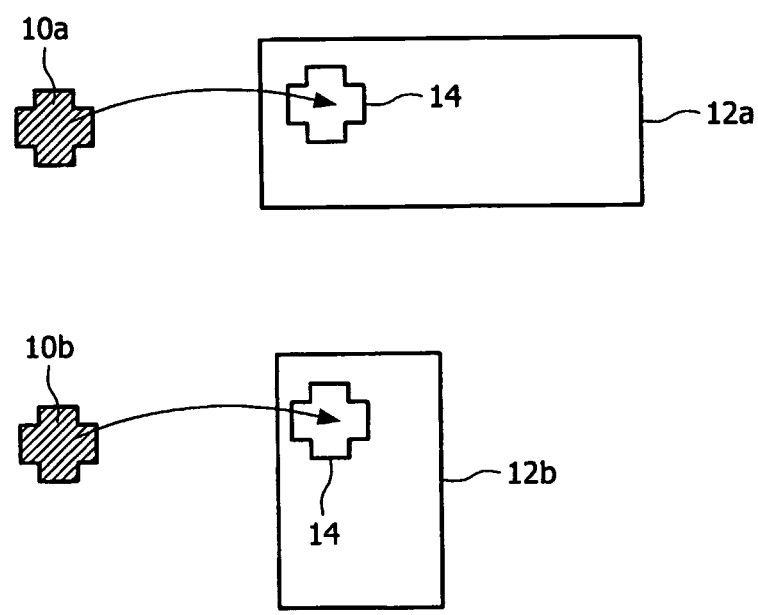
FIG. 1 illustrates host apparatus and separate e-buttons.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar features in modified and different embodiments.

FIG. 1 shows a first detachable e-button 10a operable to engage with a respective host apparatus 12a, which comprises a socket 14, adapted for receiving the detachable e-button 10a and for providing or receiving data from said engaged e-button. Also shown is a second host apparatus 12b having a similar socket 14 for receiving a respective e-button 10b. In the diagram the e-buttons 10a, 10b are depicted having a distinctive cross-like shape, with the engaging sockets 14 having a similar design to receive e-buttons 10,10b. Of course, the e-buttons may take many other physical forms.

In the following description, for the sake of simplicity, clarity, and by way of example only, the host apparatus 12a, 12b represent an audio Hi-Fi system and a remote loudspeaker respectively. Of course, the Hi-Fi and loudspeaker may comprise conventional sockets enabling audio connection and output. However, such apparatus 12a, 12b with e-button connection means 14 optionally allow configurable wireless links to be employed, enabling a user to establish and control in a simple, intuitive fashion what is in effect a radio network between chosen apparatus or devices 12a, 12b in his home.

Figure 2:
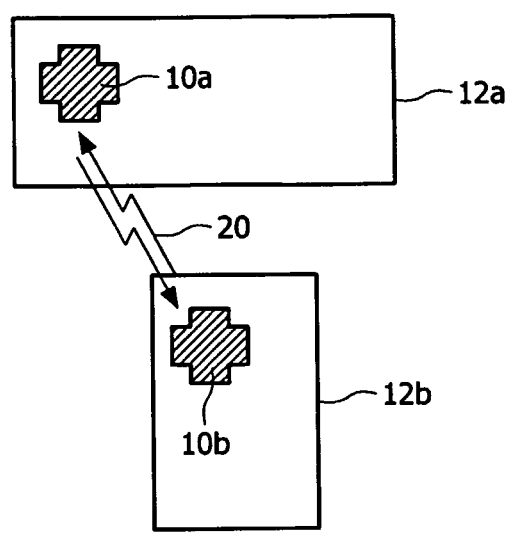
FIG. 2 illustrates host apparatus communicating via engaged e-buttons.

This is illustrated simply in FIG. 2, which shows the Hi-Fi 12a communicating wirelessly with the loudspeaker 12b across a previously configured radio link 20 via inserted respective e-buttons 10a, 10b. FIG. 2 illustrates the intention that such e-buttons should be visible and recognisable to the user. Hence, the presence of the detachable e-button illustrates the facts that the apparatus has a wireless connection capability.

The configuration of such a link 20 will now be described with reference to FIGS. 3, 4 and 5.

Figure 3:
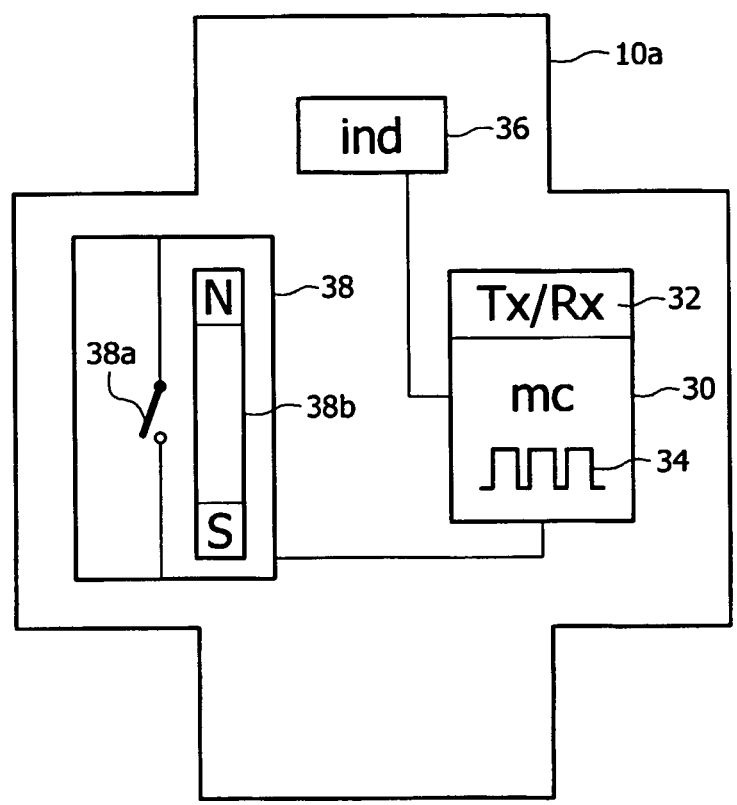
FIG. 3 is a schematic diagram showing internal components of an e-button.

FIG. 3 illustrates in more detail an example e-button device 10a. The device 10a comprises a radio micro-controller integrated circuit or "chip" (such as the well known mc8051 series of micro-controllers), which operates a radio transceiver 32 when sending or receiving radio messages. Such messages are preferably arranged according to a digital radio standard provided in hardware and software of the micro-controller/transceiver architecture. ZigBee (IEEE802.15.4) and the IEEE 802.11 family of radio standards are suitable example radio standards well known to those skilled in the art.

The micro-controller comprises timing means in the form of an internal clock oscillator 34 as is usual with such integrated circuit controllers or microprocessors. The micro-controller in this embodiment has a small amount of internal memory (not shown) for storing program instructions (a radio "stack") and variables (such as device identifiers) relating to the operation of the radio standard, and also for storing program instructions for carrying out method aspects in accordance with the present invention as will be shortly described.

The micro-controller 30 also controls indication means 36 in the form of a light emitting diode (LED) for indicating to a user the status of the e-button. The indication means 36 may also comprise loudspeaker and tone generation circuitry to provide audible indications of the e-button status to the user.

The micro-controller 30 is further connected to proximity detection means in the form of, in this embodiment, a magnetic switch module 38. The module 38 comprises a magnetically activated Reed switch 38a and a permanent magnet 38b. The switch and magnet are arranged such that some of the magnetic field lines emanating from the magnet 38b are perpendicular to the direction in which the switch closes. Hence, the switch experiences a closing force due to the magnet. However, the field strength of the magnet 38b is chosen as to be just insufficient to close the switch 38a. Hence, an increase in magnetic field strength is required for the switch 38a to close and for subsequent detection of the switch status by micro-controller 30.

Figure 4A:
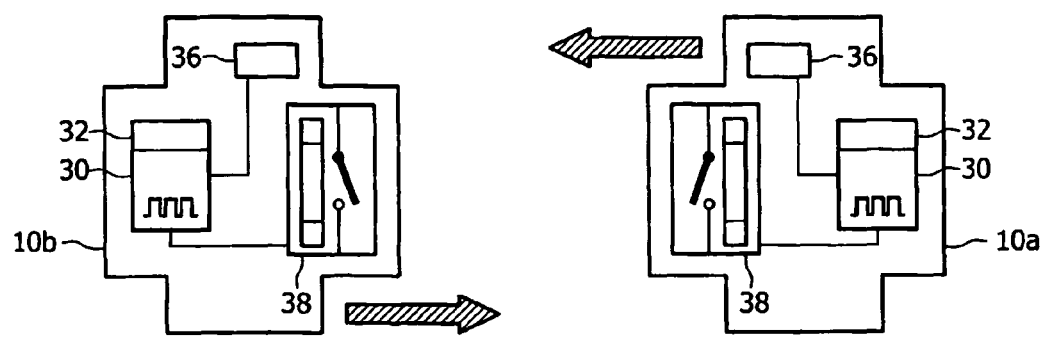
FIG. 4 is a diagram illustrating steps in the configuration of a link between a first and second e-button.
Figure 4B:
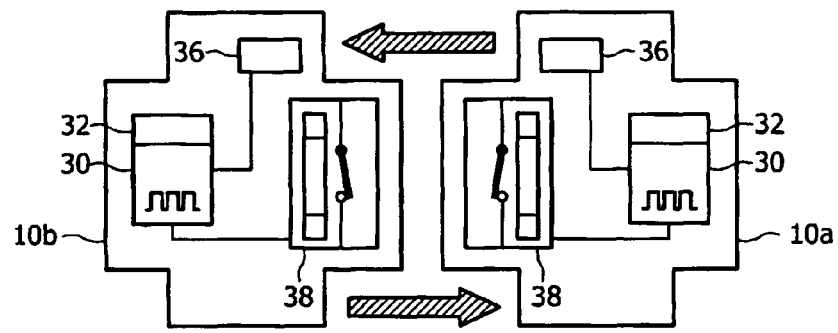

FIG. 4 illustrates in three steps a configuration operation utilising a first and second e-button as described above. FIG. 4a illustrates a first e-button 10a separated by more than a few centimetres from a second similar e-button 10b. Respective proximity detecting switch modules are in a default open state as shown. A user wishing to configure a link subsequently brings the two e-buttons 10a, 10b into close proximity with one another as shown in FIG. 4b. The magnets 38b cause a local increase in the magnetic field strength surrounding each switch module 38, causing each e-button switch 38a to close. This change in status is detected by the micro-controller 30 connected to the e-button switch module 38, which begins timing the duration of this status change (i.e. the time that the e-buttons are held in close proximity of a few millimetres to a centimetre or so). When a pre-programmed time limit is exceeded (in the range 1-10 s, preferably about 2 s) the micro-controllers 30 then begin a registration or pairing process.

The exact details of such a process depend on the specific radio standard employed, but typically such processes involve the exchange of radio device identifiers, so that future messages can be addressed to a specific device having said identifier. Hence, an e-button or device identifier is either randomly generated, selected from a stored list or retrieved if the identifier is pre-programmed and unique. For example, the ZigBee scheme provides for IEEE defined unique, hard-wired 48 or 64-bit identifiers. Such registration processes may also involve a limited amount of pre-programmed service or capability data to be exchanged.

When the registration process is complete, the indication LED 36 (under control of micro-controller 30) preferably indicates the successful completion of the exchange to the user, thereby signifying the configuring of a link between the first and second e-button. For example, the LED may flash when proximity is first detected and, following the predetermined time period and exchange, then remain on following successful exchange. Of course, the LED may be controlled by the micro-controller to signify the status to the user in other ways, and other audible or vibration means may be incorporated depending on a manufacturers cost options.

Figure 4C:
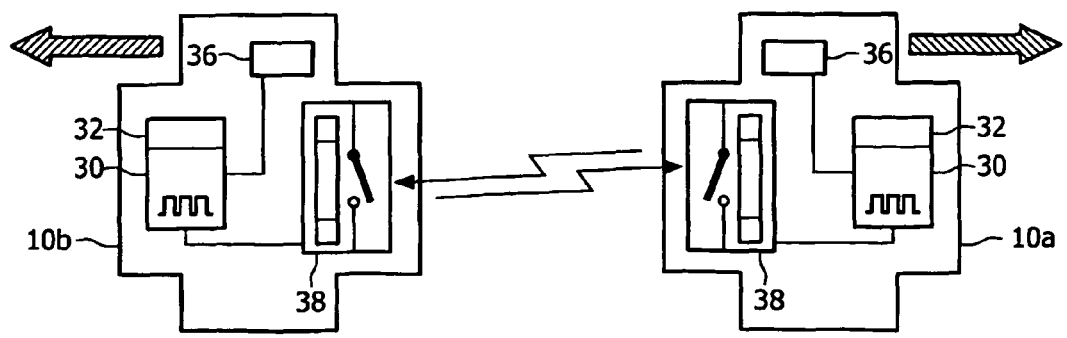

Following the indication, the user simply physically separates the two e-buttons as shown in FIG. 4c, the switches open and the paired e-buttons may be engaged with the Hi-Fi and loudspeaker (for example) to provide a wireless link therebetween.

Suppose that the user, at some future date, decides to pair the first e-button 10a with another or further e-button. He may simply repeat the process shown in FIG. 4, thereby creating a one-to-many link regarding the first e-button and several other e-buttons.

Conversely, to delete or cancel a link already established between two e-buttons, the user simply repeats the steps of FIG. 4 with the required e-buttons. In this instance the micro-controllers 30 check the exchanged identifier with those already received and stored. Should a match be found, the micro-controller deletes the exchanged and stored identifier thereby severing the link. Hence, an automatic deregistration (or "un-pairing") process is provided requiring no more steps than already described for the user.

Optionally, the indicator LED 36 may also indicate to a user that a link already exists during the predetermined time-period. Hence, a user may check whether an e-button is linked with another by bringing them together, and should the LED signify the existence of such a link, the user then separates the e-buttons before the registration (or de-registration) process begins.

Figure 5:
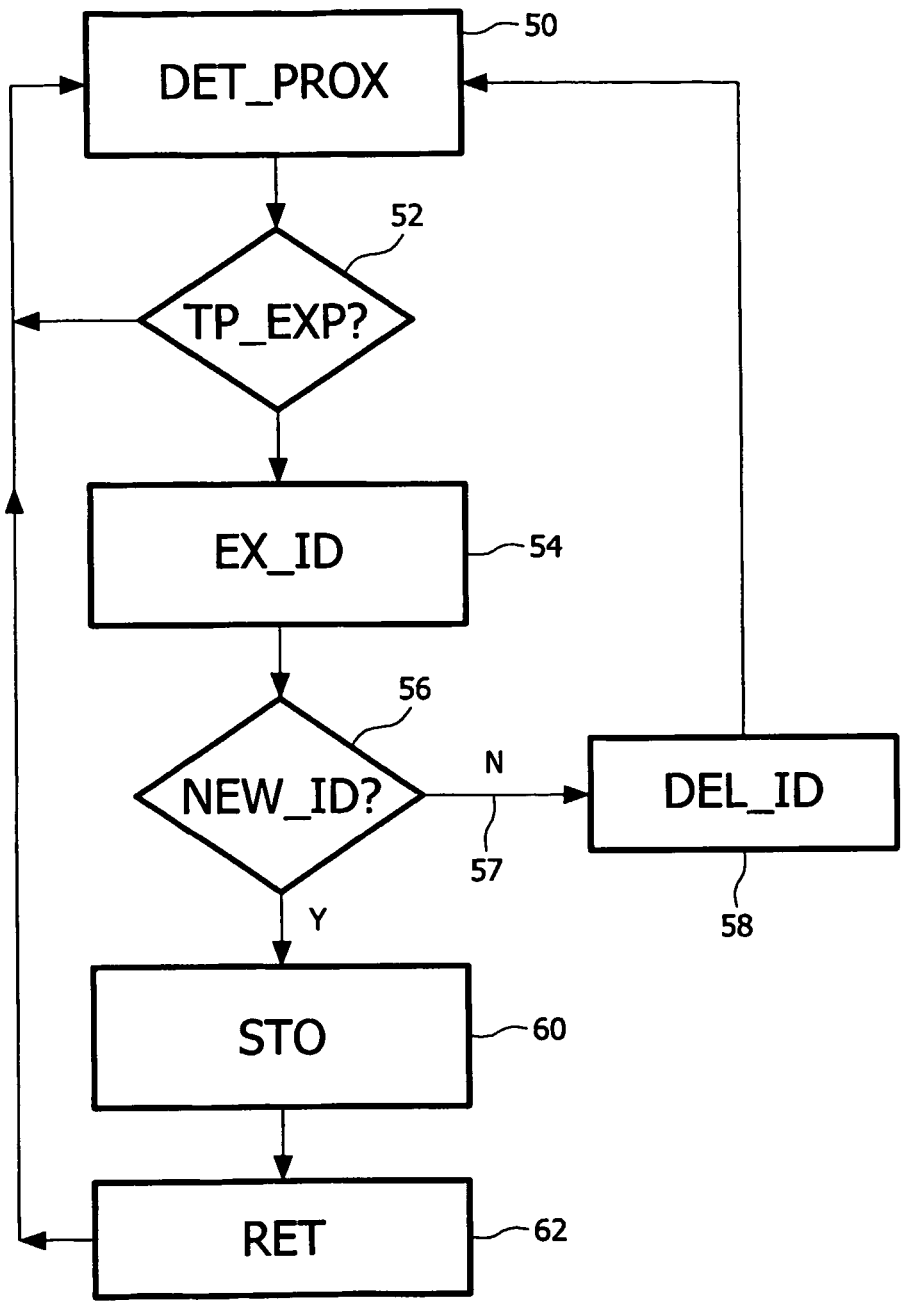
FIG. 5 is a flowchart representing steps in a method for configuring a link between two e-buttons.

FIG. 5 illustrates generally the process steps described above, and followed by an e-button micro-controller suitably programmed. In a first step 50, proximity is detected (DET_PROX), following which the micro-controller begins monitoring at step 52 for the expiration of the predetermined time period (TP_EXP?). When the period is ended, and proximity is still detected, program flow follows to step 54 in which the e-button identifiers are exchanged (EX_ID). The micro-controller then checks at step 56 whether the received identifier is already known (NEW_ID?) to it, and if so follows path 57 to achieve deletion of the identifier at step 58.

In the event that the check at step 56 reveals that the identifier is new, then the micro-controller stores (STO) the identifier at step 60, performs other operations related to registration and establishment of a link with the e-button providing the identifier, and finally returns at step 62 to monitoring for proximity detection.

The indication steps of the process are not shown in FIG. 5, but those skilled in the art will appreciate that the micro-controller may be programmed to indicate the status of the process, and whether links are already configured, newly configured or deleted as appropriate.

Hence, an intuitive, simple and flexible mechanism for configuring radio links in a system is provided.

Figure 6:
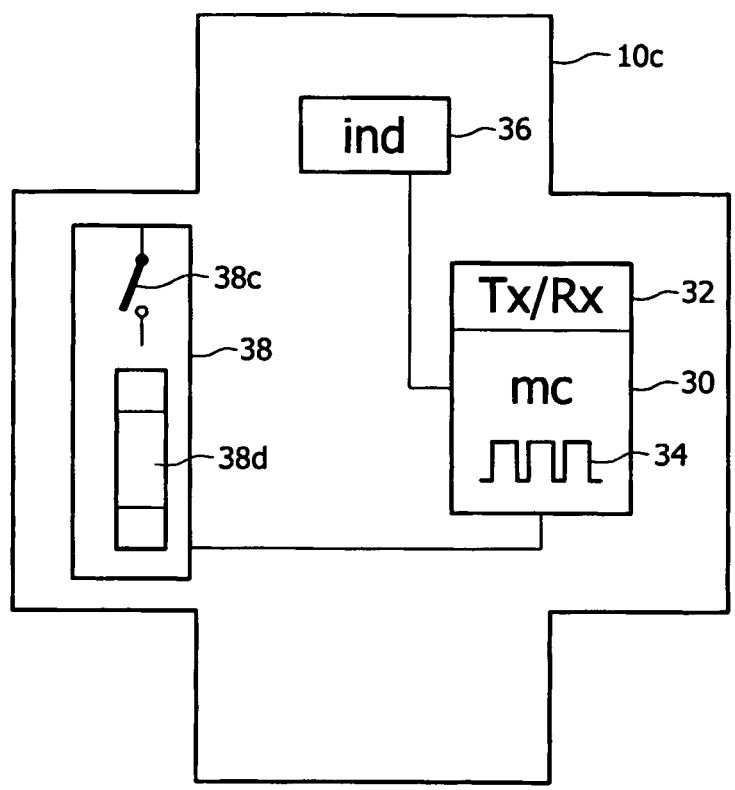
FIG. 6 is a schematic diagram showing a different arrangement of the internal components of an e-button.

FIG. 6 shows an e-button 10*c* as before except that the proximity-switching module 38 is arranged differently. In this device embodiment, the magnet 38*d* is of sufficient strength to close the switch 38*c*, but is disposed in relation to the switch 38*c* such that the magnetic field lines emanating from the magnet 38*d* are parallel to the direction in which the switch 38*c* closes. Hence, little or no closing force is present on the switch.

Figure 7:
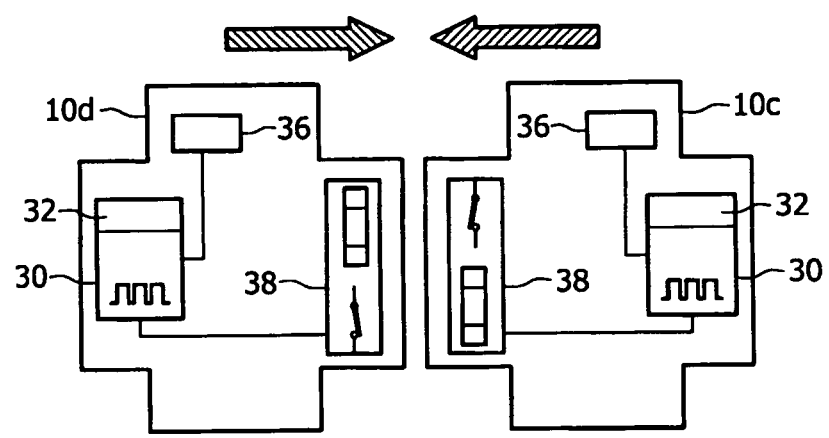
FIG. 7 illustrates the e-buttons of FIG. 6 when brought into close proximity.

However, as shown in FIG. 7, the magnet 38*d* of another similarly designed e-button 10*d* may supply sufficient force roughly perpendicular to the direction in which the switch 38*c* of e-button 10*c* closes. Hence, proximity may be detected, with the e-buttons operating as previously described to configure links therebetween. Preferably, the e-buttons 10*c* and 10*d* are shaped or labelled so as to indicate to a user the preferred proximity orientation of the e-buttons when configuring links.

Those skilled in the art will further recognise that the e-buttons, if sold separately, may be powered using an internal power supply initially inhibited by the proximity detection switch module. For example, a watch battery or the like may be inhibited from powering up the e-button by a suitably placed magnetic field supplied in or by the shelf packaging material. Once the e-button is removed, the switch opens and the internal power supply (not shown in the Figures) powers up the micro-controller and hence the e-button.

Those skilled in the art will additionally appreciate that the e-button may draw power from a host apparatus once it is engaged with said host apparatus.

In the above a radio system, devices and methods of configuring radio links are described. Whilst the above embodiments describe a system utilising e-buttons having magnetic proximity detection means (such as Reed switches and Hall switches) to detect and configure links between said e-buttons, those skilled in the art will recognise that other variations on proximity detection may be used.

For example, the e-buttons may be modified to physically attach to each other to provide proximity detection, or perhaps may incorporate a very short-range optical (for example infrared) circuit for detecting proximity and thus initiating configuration of a wireless link. Similarly, those skilled in the art will appreciate that the means for engaging an e-button or device with a host apparatus may comprise infra-red or other non-physical short range engagement means, with data from the host apparatus being received by the engaged device and converted for longer range radio transmission.

From reading the present disclosure, other modifications will be apparent to persons skilled in the art. Such modifications may involve other features which are already known in the design, manufacture and use of radio devices, host apparatus for receiving said devices and component parts thereof and which may be used instead of or in addition to features already described herein without departing from the spirit and scope of the present invention.

In the present specification and claims the word "a" or "an" preceding an element does not exclude the presence of a plurality of such elements.

The invention claimed is:

1. A method of configuring a radio link between a first device and a second device, each of the first device and the second device comprises radio means and wherein at least one of the first device and the second device comprises proximity detection means and timing means, wherein said method comprises the acts of:
    detecting proximity between the first device and the second device when the first device and the second device are within a predetermined distance of each other,
    detecting a duration of the proximity of the first device and the second device to each other,
    exchanging identifiers between the first device and the second device in response to the duration of the proximity exceeding a predetermined duration,
    determining that the identifiers received by the first device and the second device are known; and
    establishing the link if the identifiers are known and the link is not already established.

2. The method as claim 1, wherein said predetermined duration is between substantially two and ten seconds.

3. The method as claimed in claim 1, wherein said predetermined duration is about 2 seconds.

4. The method as claimed in claim 1, wherein said identifiers are pre-installed radio identifiers.

5. The method as claimed in claim 1, wherein said identifiers are randomly generated radio identifiers.

6. The method as claimed in claim 1, further comprising the act of indicating a configuration status of the link.

7. The method of claim 1, further comprising the act of removing the link if the link is already established.

8. A system having devices including a first radio device and a second radio device comprising radio means operable to communicate via a configurable radio link therebetween, and wherein at least one of said devices comprises proximity detection means for detecting proximity between the first radio device and the second radio device when said devices are within a predetermined distance of each other, and timing means for detecting duration of said proximity, and wherein said radio means are further operable to exchange identifiers between the first device and the second device in response to the duration of the proximity exceed in determined duration and establish the radio link in response to the identifiers being known and the radio link is not a ready established.

9. The system as claimed in claim 8, wherein said first and second device are adapted to physically connect with respective host apparatus and wherein said apparatus communicate with one another via said configurable radio link.

10. The system of claim 8, wherein said radio means remove the radio link if the radio link is already established.

11. A radio device operable to communicate via a configurable radio link with a further device, the radio device comprising proximity detection means for detecting proximity between the radio device and the further device when the radio device and the further device are within a predetermined distance of each other, timing means for detecting duration of said proximity, and radio means for exchanging identifiers between the first device and the second device in response to the duration of the proximity exceeding predetermined duration and establishing the radio link in response to the identifiers being known and the radio link is not already established.

12. The radio device as claimed in claim 11, wherein said proximity detection means comprises a reed switch and magnet.

13. The radio device as claimed in claim 12, wherein said magnet has insufficient field strength to operate said reed switch and wherein said switch and magnet are arranged such that some of the magnetic field lines emanating from the magnet are perpendicular to the direction in which the switch closes.

14. The radio device as claimed in claim 13, wherein said timing means comprises micro-controller connected with said proximity detection means.

15. The radio device as claim 12, wherein said magnet has sufficient field strength to operate said reed switch, and wherein said reed switch and magnet are arranged such that the magnetic field lines emanating from the magnet are substantially parallel to the direction in which the switch closes.

16. The radio device as claimed it claim 14, wherein said radio means comprises digital transceiver controlled by said micro-controller.

17. device as claimed in claim 11, the device being further adapted to physically connect with a host apparatus and provide and receive data to and from said host apparatus.

18. The system of claim 11, wherein said radio means remove the radio link if the radio link is already established.

19. A method of configuring a radio link between a first device and a second device comprising the acts of:
detecting proximity between the first device and the second device when the first device and the second device are within a predetermined distance of each other;
detecting a duration of the proximity of the first device and the second device to each other;
exchanging identifiers between the first device and the second device in response to the duration of the proximity exceeding a predetermined duration; and
establishing the radio link if the identifiers are known.

20. A system comprising;
a first device; and
a second device for communicating with the first device via a radio link;
wherein at least one of the first device and the second device comprises:
a proximity detector configured to detect proximity between the first device and the second device when the first device and the second device are within a predetermined distance of each other;
a timer configured to detect duration of the proximity, and
a processor configure to exchange identifiers between the first device and the second device in response to the duration of the proximity exceeding a predetermined duration, and determine that the identifiers received by the first device end the second device are known;
wherein the radio link is established if the identifiers are known.

21. A radio device operable to communicate via radio link with a further device, the radio device comprising:
a proximity detector configured to detect proximity between the radio device and the further device when the radio device and the further device are within a predetermined distance of each other;
a timer configured to detect duration of the proximity;
a processor configure to exchange identifiers between the first device and the second device in response to the duration of the proximity exceeding a predetermined duration, and determine that the identifiers received by the first device and the second device are known; and
a transceiver for establishing the radio link if the identifiers are known.

22. The radio device of claim 21, wherein the proximity detector comprises a reed switch and magnet, the reed switch being positioned substantially perpendicular to magnetic field lines emanating from the magnet, wherein the magnet has insufficient field strength to operate the reed switch so that the reed switch is not operated by the magnetic field lines substantially perpendicular to the reed switch.

23. The radio device of claim 21, wherein the proximity detector comprises a reed switch and magnet, the magnet having sufficient field strength to operate the reed switch, wherein the reed switch is positioned substantially parallel to magnetic field lines emanating from the magnet so that the reed switch is not operated by the magnetic field lines substantially parallel to the reed switch.

24. The radio device of claim 21, wherein the proximity detector comprises a reed switch and magnet, the reed switch being activated by a further magnet of the further device it the further device is within the predetermined distance, wherein the reed switch is connected to the timer for determination of duration of activation of the reed switch and establishment of the radio link in response to the duration of activation exceeding the predetermined duration.

* * * * *